Dec. 6, 1966     E. CHANDLER     3,289,454
JOGGLING TOOL
Filed Sept. 6, 1963     2 Sheets-Sheet 1
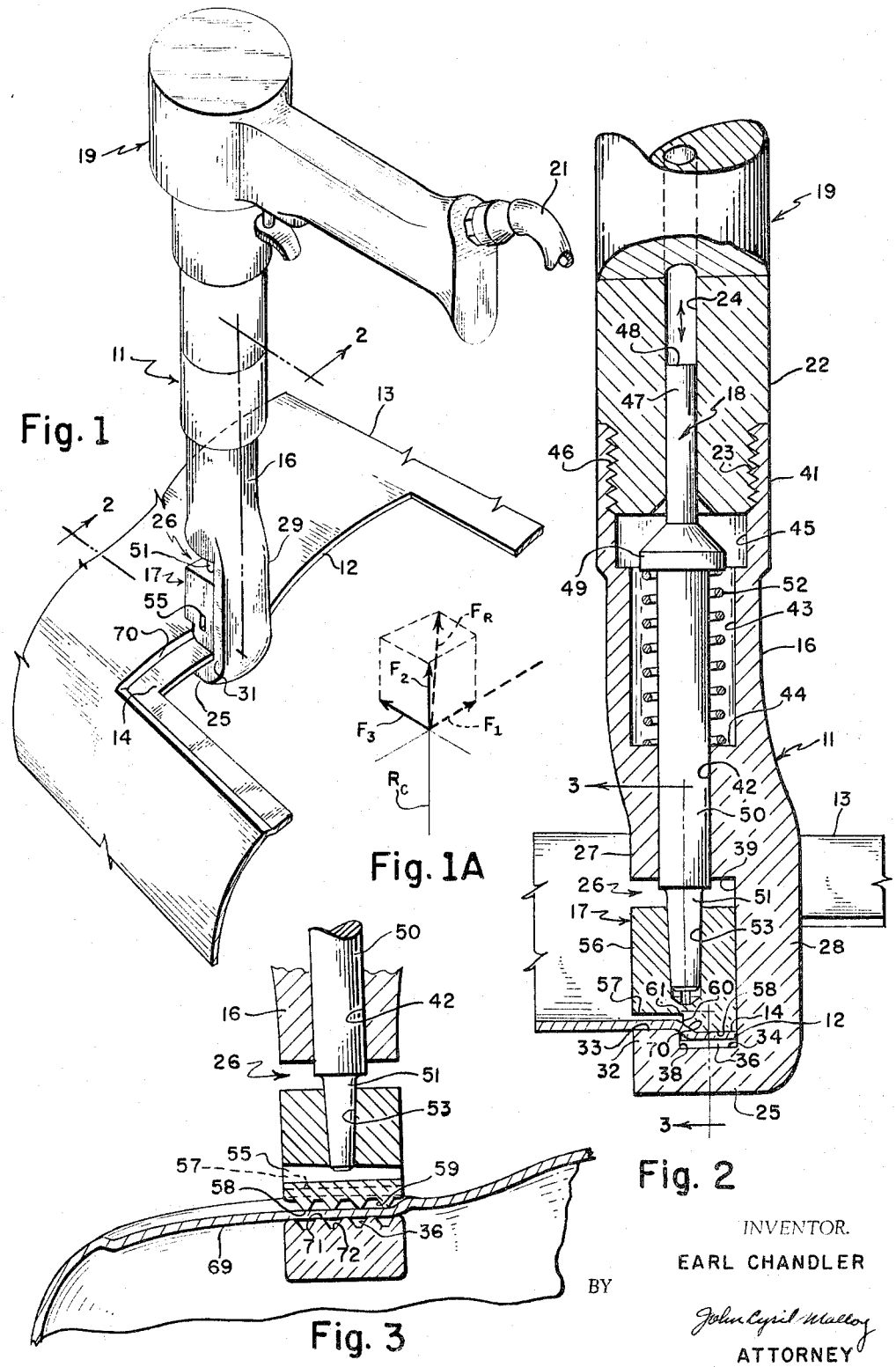
INVENTOR.
EARL CHANDLER
BY *John Cyril Malloy*
ATTORNEY Dec. 6, 1966  E. CHANDLER  3,289,454
JOGGLING TOOL
Filed Sept. 6, 1963  2 Sheets-Sheet 2

INVENTOR.
EARL CHANDLER
BY John Cyril Malloy
ATTORNEY

United States Patent Office 3,289,454
Patented Dec. 6, 1966

3,289,454
JOGGLING TOOL
Earl Chandler, 17211 NW. 37th Ave., Opa-Locka, Fla.
Filed Sept. 6, 1963, Ser. No. 307,105
6 Claims. (Cl. 72—385)

This invention relates to joggling tools, and a method of joggling, and, more particularly, to a joggling tool including a head having a toothed mouth with a lip and a toothed jaw moveable in the mouth to rapidly and successively grip and strike a marginal edge of a contoured sheet between the toothed mouth and lip and the toothed jaw to joggle the edge as the tool is traveled therealong.

When automobiles or the like are damaged in collisions, it is often that a section of a relatively large curved panel is dented or crushed and must be either repaired or replaced. Often, repair has been accomplished by smoothing out, as much as possible, the damaged area by use of hammers or the like and filling any troughs or irregularities with a suitable filler over which a finish is applied. The instant tool permits a different method of repairing a damaged area of a panel which is contoured in shape. The damaged area is cut away by a suitable cutting implement leaving a hole to be patched. Using the tool described hereinafter, the edges of the hole are joggled; that is, a flat bearing, marginal area, or simply a flat, is provided which is off-set from the main surface of the panel to be repaired. A replacement piece, cut to size, is positioned over the hole and welded or otherwise suitably fastened to the flat. Additionally, a hole may be cut in the damaged panel and, instead of joggling the marginal edges of the hole, the edges of the replacement piece may be joggled and then the piece fastened to the panel. Also, at times it may be desirable to joggle both the edges of the hole and the replacement piece.

Tools have been developed which are similar in operation and in construction to that which I describe hereinafter; however, such tools have not been satisfactory on the many contoured surfaces which characterize the modern automobile. In the past, marginal edges of a sheet have been successfully joggled between an anvil and a moveable jaw driven by a reciprocating hammer, but, when used on the edge of a contoured sheet or piece of metal, the tools have not functioned to achieve a smooth flat that satisfactorily follows the main surface of a contoured sheet, the resulting joggled area having high and low areas causing a problem in restoring the panel to a close approximation of its original shape without time-consuming labor.

I have found that when teeth, which are substantially perpendicular to an edge being joggled, as described hereinafter, are provided on a joggling tool adapted to be traveled along the edge of a curved piece of metal, a flat will be provided which satisfactorily follows the original shape of the panel and which will readily accept a replacement piece.

Accordingly, it is an object of this invention to provide a joggling tool having impacting members adapted to form a flat which is uniformly off-set relative to the main piece, the said flat being along an edge of a contoured piece of metal.

It is also an object of this invention to provide a tool adapted to joggle a marginal edge of a contoured piece of metal between a pair of opposing flat surfaces of impacting members for providing a uniformly off-set flat relative to the main surface.

It is a more specific object of this invention to provide a flat which follows a contoured piece of metal by means of a tool having impacting toothed members adapted to strike and grip a marginal edge of a piece of metal.

In accordance with these and other objects which will become apparent hereinafter, the instant invention will now be described with reference to the accompanying drawings illustrating a preferred embodiment thereof.

In the drawings:

FIG. 1 is a perspective view illustrating the attitude of the instant tool in operation;

FIG. 1A is a force direction diagram which does not purport to show quantity but to indicate direction generally;

FIG. 2 is a partial cross-sectional view taken along the plane indicated by the numerals 2—2 of FIG. 1 and looking in the direction of the arrows;

FIG. 3 is a partial cross-sectioned view taken along the line 3—3 of FIG. 2 and looking in the direction of the arrows;

Figure 4:
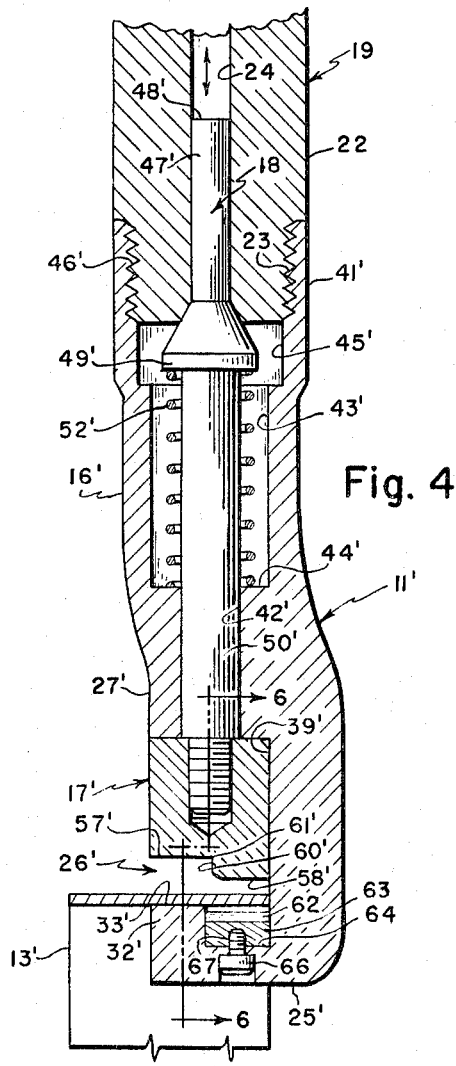
FIG. 4 is a cross-sectioned view similar to FIG. 2 and illustrating a jaws open position of an alternative embodiment.

Referring to the drawings, wherein like reference characters designate like or corresponding parts throughout the different views, and referring particularly to FIG. 1, the numeral 11 designates generally a hand held tool for joggling a marginal edge 12 of a curved sheet of metal 13, the flat of the joggled portion being designated by the numeral 14. The tool 11, when in use, includes a head 16, a moveable jaw 17 mounted to a reciprocal piston or ram 18, the said piston being adapted to rapidly reciprocate within the head by suitable means, such as a powered hammer 19, to which fluid under alternating pressure may be transmitted as by the hose 21.

Referring to FIG. 2, the shank 22 of an air hammer is threaded at the end 23 and is provided with a longitudinal fluid passageway 24 for transmitting pressure therethrough. The head 16 of the tool has a cut-out adjacent one end 25 of the head forming a mouth 26 in the front face or surface 27 thereof; the said mouth extends across the face 27 and depth-wise in the head defining a rear wall 28, which can be seen in the lateral surfaces 29 and 31. A lip 32 having a relatively flat distal surface 33 extends into the mouth, the outer surface of the lip being a continuation of the face 27. The floor 34 of the mouth is provided with a plurality of parallel teeth 36 extending depth-wise from the inner surface 38 of the lip to the inner surface 39 of the rear wall 28, the said teeth being seen in FIG. 3. The end 41 of the head is provided with a first central longitudinal bore 42, a second larger and coaxial bore 43 defining a shoulder 44 between the first and second bores, and a third larger bore 45 which is threaded along the length thereof as at 46. In assembly, the threaded third bore of the head receives therein, in male and female relation, the threaded end 23 of the hammer shank 22. As shown, the piston or ram 18 is generally slender and cylindrical in shape having (a) a first portion 47 which is slideably received in the passageway 24 and is adapted to be slideably responsive to variations in fluid pressures applied to the end 48, (b) an enlarged intermediate portion 49 for a purpose to be described, and (c) a third portion 50 slideable within the first bore 42. The end 51 of the portion 50 is tapered and is of a length such that it extends into the mouth 26. A spring 52 is disposed about the third portion of the piston and, in assembly, is confined between the enlarged intermediate portion 49 of the piston, which forms a seat for the spring, and the aforesaid shoulder 44.

The moveable jaw piece 17 is disposed in the mouth 26 and suitably fastened to the piston, such as by the provision of a tapered bore 53 for receiving the tapered end 51 of the piston. The jaw piece 17 is provided with a cut-out across the surface 56 forming a stepped surface having a higher and a lower area 57 and 58 respectively which, in assembly, confront and are of corresponding and co-operating size in relation to the surface 33 of the lip and floor 34 respectively, there being sufficient room between the inner lip surface 38 and the surface 61, between the higher and lower areas 57 and 58 of the jaw, to permit the operation described hereinafter. A plurality of parallel teeth 59 is provided on the lower area 58 of the jaw 17 for co-operation with the aforesaid teeth 36, which operation will be described hereinafter, it being noted the front face 60 of the teeth 59 are relieved as shown. Referring to FIGS. 1 and 3, a tapered slot 55 may be provided in the jaw piece for accommodating a knock-out pin to remove the jaw piece from the piston.

Figure 5:
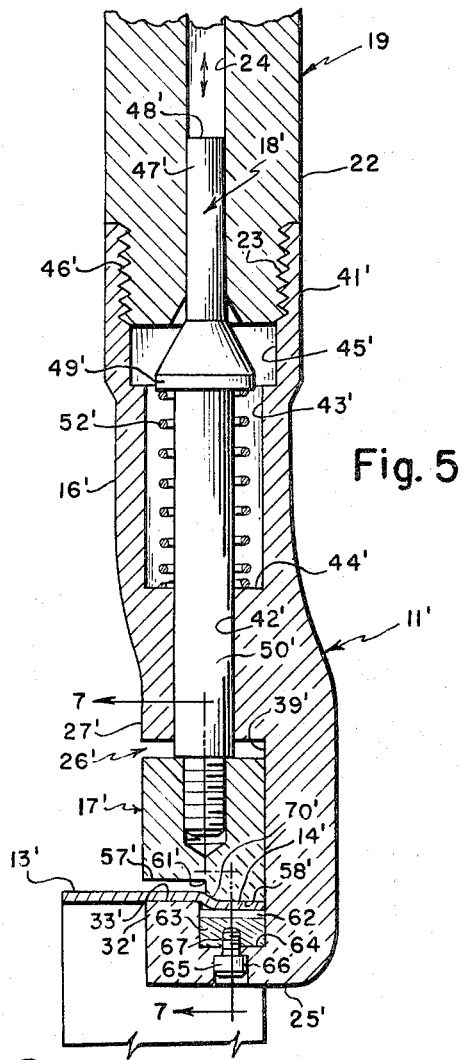
FIG. 5 is a cross-sectioned view similar to FIG. 4 and illustrating a jaws closed position of the embodiment of FIG. 4.
Figure 6:
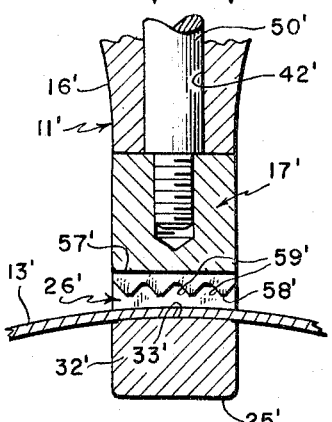
FIG. 6 is a cross-sectioned view taken along the line 6—6 of FIG. 4 and looking in the direction of the arrows.
Figure 7:
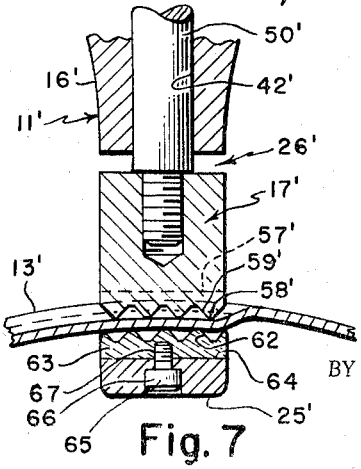
FIG. 7 is a cross-sectioned view taken along the line 7—7 of FIG. 5 and looking in the direction of the arrows.

With reference to the alternative embodiments of FIGS. 4 through 7, the embodiments differs from the above-described tool in that a set of teeth 62 are provided in a stationary jaw 63 fastened to a flat floor 64 of the mouth 26' by means of a cap screw 66 threadably received in a threaded hole 67 with the head 65 of the cap screw 66 being seated in a counter-bore in the surface 25'.

With further reference to FIGS. 4 through 7, for clarity, the shank of the housing, the head, the piston, the moveable jaw and the spring, as well as the respective portions thereof, are designated by the same numerals as in FIGS. 1 through 3, with the exception that a prime designation has been added to the respective numerals. Thus, the piston is designated 18', the head 16', the moveable jaw 17', etc.

In operation, with reference to FIGS. 1 and 1A, the tool is traveled along the marginal edge 12 of the contoured sheet 13, which is being joggled with the resultant applied force $F_R$ being exerted on the tool by an operator in the general direction shown being relative to the edge, which force has a component in each of three directions; $F_1$ in the direction of travel, $F_2$ upwardly; that is, aligned with the radius of curvature of the metal piece at the point being worked, to maintain the surface of the lip against the underside 69 of the metal, and $F_3$ inwardly maintaining the edge 12 in abutting relation with the inner surface 39 of the rear wall 28. As the tool is traveled thusly, the piston rapidly reciprocates the jaw so that the toothed lower area repeatedly strikes and grips the marginal edge against the lip and teeth 36 forming the flat 14 and off-set or step 70. Each pressure pulse on the end 48 of the ram or piston drives the jaw 17 downwardly and, at the same time simultaneously stores energy in the spring 52. Between pulses, the energy stored in the spring is released pulling the toothed area of the jaw upwardly for a next downward movement upon the next succeeding application of pressure to the end 48.

In the following paragraph, the teeth 36 of the floor will be considered as a series of aligned ridges 71 and valleys 72. Good results have been obtained with the valleys slightly wider and deeper than the teeth of the jaw and with the ridges slightly smaller than the corresponding part of the jaw teeth. While this disclosure is not intended to be limited, except as claimed, to the dimensions of FIG. 3, it has been found that the provision of four teeth over the length shown, which is approximately one inch, is satisfactory for joggling the edges of commonly encountered panels of the automobiles in use as of this date.

Also, without intending to limit this disclosure, it may be that my tool displaces a portion of the metal between the teeth and between the lip and relief of the front face of the teeth, because, since contoured sheets have a radius of curvature for each part of an edge and, when the edge is joggled, the radius of curvature of the flat is reduced by the amount of the offset, there results an actual, though slight, reduction in the length of the flat. In the joggled flat formed by my tool, the excess metal of the edge appears to be drawn into a slightly wavy appearance adjacent the off-set area indicating that some of the metal is displaced.

The teeth as described adapt the tool to joggle an edge of a contoured sheet and the flat thus formed has substantially the same radius of curvature at the point being worked and varies substantially as the radius of curvature varies along the edge being worked of the main surface of the sheet. The teeth align the longitudinal axis of the tool with the radius of curvature as it varies while the tool is drawn along the marginal edge of a contoured sheet striking and gripping the edge each working stroke and releasing the flat between the working strokes so that the inherent resilience of the metal springs the surface back to a position which causes the flat to follow and closely approximate the contour of the main surface.

While the instant invention has been shown and described herein in what is conceived to be the most practical and preferred embodiment, it is recognized that departures may be made therefrom within the scope of the invention, which is, therefore, not to be limited to the details disclosed herein but is to be accorded the full scope of the claims so as to embrace any and all equivalent apparatus and articles.

What is claimed is:

1. In a hand held tool adapted to be traveled along the marginal edge of a contoured sheet of metallic material to joggle the edge and in which said tool is adapted for attachment and operation by a power hammer the improvement comprising a head having front, rear and side surfaces, and a mouth extending into the head across the front surface with the mouth defining a roof, a recessed floor, a rear wall and a lip having a distal surface extending from the floor into the opening along the front surface, the floor of the mouth being provided with a plurality of parallel teeth extending rearwardly across the floor; a moveable jaw having a top, bottom and side surfaces disposed in the mouth with the bottom surface being relieved defining a first and second area with a relief area there-between, the said second area having a plurality of parallel teeth across the surface thereof opposing in meshing relationship the teeth of the floor, said jaw being moveable within the mouth from a jaw open position to a jaw closed position and adapted to receive the marginal edge of a contoured sheet of metal between both the roof and distal surface and the jaw with the edge of the sheet extending into the mouth, said first area, said second area, and said relief area confronting the distal surface, said floor and said lip respectively when in the jaw closed position whereby rapid reciprocating of said jaw between jaw open and closed positions strikes and grips rapidly and successively on and joggles the marginal edge.

2. A hand held tool as set forth in claim 1 wherein the front surface is one inch in length and four teeth are provided on the jaw respectively.

3. In a power-operated tool to travel along the marginal edge of a contoured sheet of metal to joggle the edge including a head having a mouth defining a floor and a lip extending into the mouth along the outer surface of the head, a jaw relieved with respect to the lip and moveable in said mouth from a jaw open to a jaw closed position and adapted to cyclically impact upon the marginal edge of a sheet of metal, the improvement which resides in providing a plurality of teeth extending in parallel relation across the floor of the mouth and opposing teeth on the jaw for gripping and impacting on the edge, said teeth on said floor and jaw being disposed in intermeshing relationship with respect to each other.

4. The structure as claimed in claim 3 in which said teeth are disposed substantially perpendicular to said rear surface of said head.

5. The structure as claimed in claim 3 wherein said teeth extend transversely over a length of substantially one inch.

6. The structure as claimed in claim 5 in which at least one of said sets of teeth on said jaw and floor surface comprises four teeth.

References Cited by the Examiner

UNITED STATES PATENTS

| | | | |
|---|---|---|---|
| 273,382 | 3/1883 | Packham | 72—114 |
| 2,363,931 | 11/1944 | Beard | 72—412 |
| 2,414,178 | 1/1947 | Sprinkle | 72—412 |
| 2,595,207 | 4/1952 | Uberti | 72—412 |
| 3,215,008 | 11/1965 | Chandler | 72—386 |

CHARLES W. LANHAM, *Primary Examiner.*

L. A. LARSON, *Assistant Examiner.*